United States Patent [19]
Morse

[11] Patent Number: 4,899,244
[45] Date of Patent: Feb. 6, 1990

[54] DISK CARTRIDGE WITH HUB SEAL
[75] Inventor: John B. Morse, Boston, Mass.
[73] Assignee: Polaroid Corporation, Cambridge, Mass.
[21] Appl. No.: 225,463
[22] Filed: Jul. 28, 1988
[51] Int. Cl.[4] .................... G11B 23/03; G11B 17/022
[52] U.S. Cl. .................................. 360/133; 360/99.12
[58] Field of Search ................... 360/133, 99.12, 99.05, 360/98.08; 369/270, 260, 261

[56]  References Cited
U.S. PATENT DOCUMENTS

| | | | |
|---|---|---|---|
| 3,715,739 | 2/1973 | Van Acker | 360/133 |
| 3,798,667 | 3/1974 | Land | 95/11 |
| 3,822,776 | 7/1974 | Pratt | 197/103 |
| 3,860,771 | 1/1975 | Lynn et al. | 200/5 |
| 3,964,593 | 6/1976 | Pointon | 197/98 |
| 4,032,729 | 6/1977 | Koistinen | 200/5 |
| 4,078,246 | 3/1978 | Berthoux et al. | 360/133 |
| 4,084,200 | 4/1978 | Adair et al. | 360/133 |
| 4,459,628 | 7/1984 | Barton | 360/133 |
| 4,468,002 | 3/1987 | Mroz | 360/137 |
| 4,544,977 | 10/1985 | Ozawa | 360/133 |
| 4,550,355 | 10/1985 | Larson et al. | 360/133 |
| 4,553,009 | 11/1985 | Van Zeeland | 200/340 |
| 4,571,718 | 2/1986 | Cahill et al. | 360/133 |
| 4,573,096 | 2/1986 | Gerfast | 360/133 |
| 4,636,904 | 1/1987 | Matsuno | 360/133 |
| 4,652,961 | 3/1987 | Dieffenbach | 360/133 |
| 4,654,741 | 3/1987 | Suzuki | 360/133 |
| 4,654,742 | 3/1987 | Harris et al. | 360/133 |
| 4,656,550 | 4/1987 | Iizuka et al. | 360/133 |
| 4,669,078 | 5/1987 | Ogusu | 360/133 |
| 4,691,257 | 9/1987 | Taguchi et al. | 360/97 |
| 4,692,831 | 9/1987 | Suzuki | 360/133 |
| 4,694,448 | 9/1987 | Tamaru et al. | 360/133 |
| 4,707,751 | 11/1987 | Ozaki et al. | 360/97 |

Primary Examiner—John H. Wolff
Assistant Examiner—Matthew J. Bussan
Attorney, Agent, or Firm—John S. Vale

[57] ABSTRACT

A disk cartridge, operable with a disk drive, includes a generally flat-shaped case enclosing a recording medium disposed on a disk about a central hub. The case includes top and bottom walls disposed on opposite sides of the disk, the bottom wall having an access opening through which a disk drive is to engage with the hub. A foil spring has a generally flared dish shape, and is symmetrically formed and positioned about a central axis of the hub. The spring is positioned between the disk and the top wall for urging the disk toward the bottom wall to close the access opening with the hub and to close a spindle receiving aperture in the hub to prevent entry of contaminants during periods of nonuse.

17 Claims, 6 Drawing Sheets

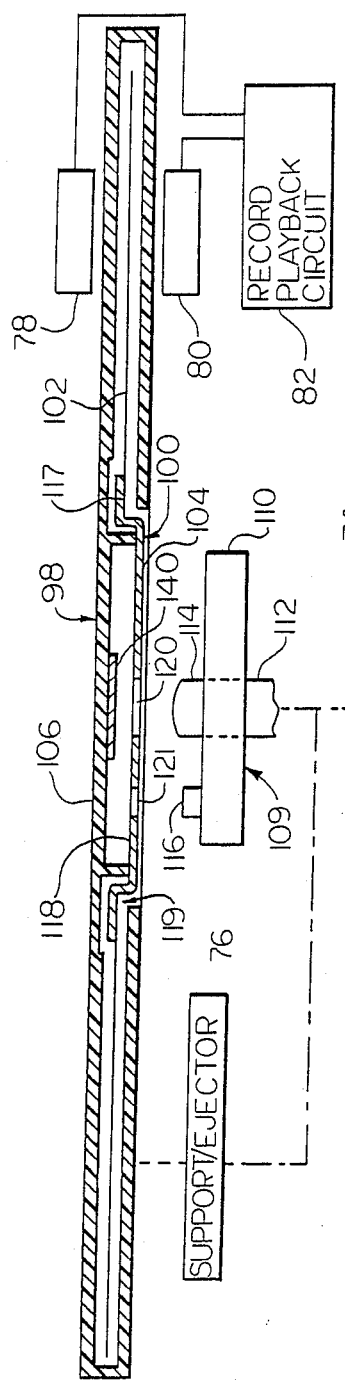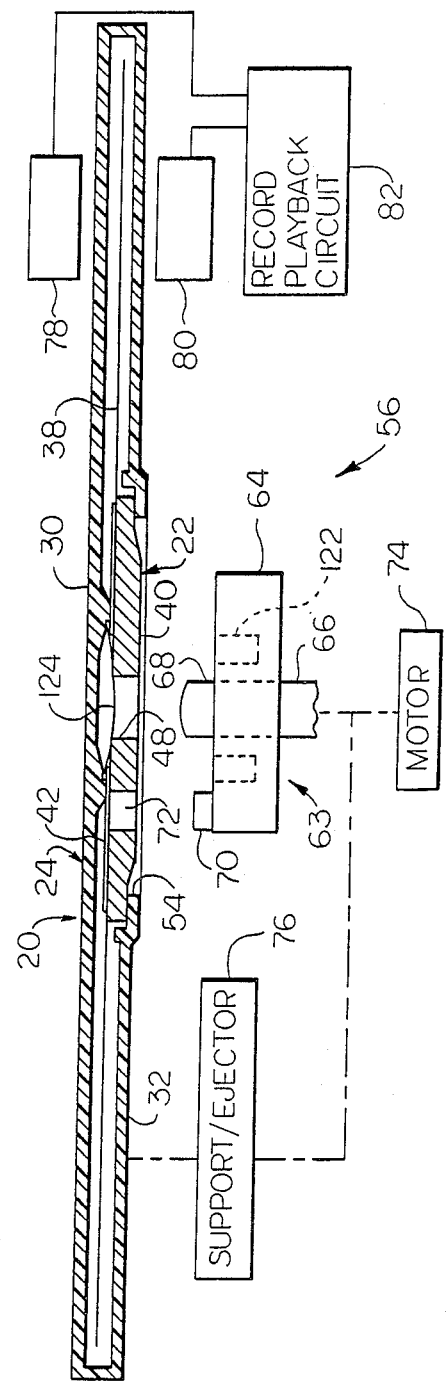

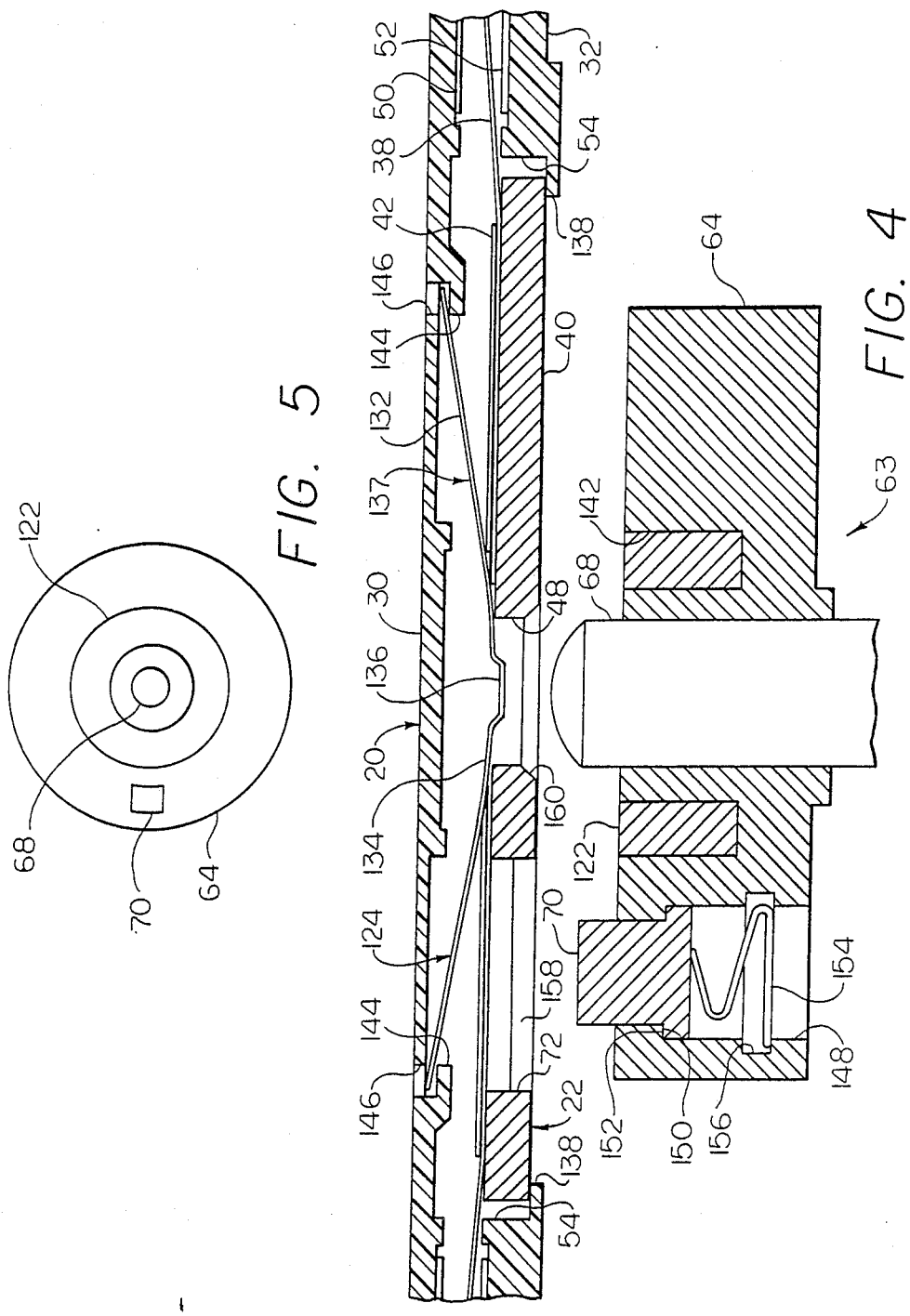

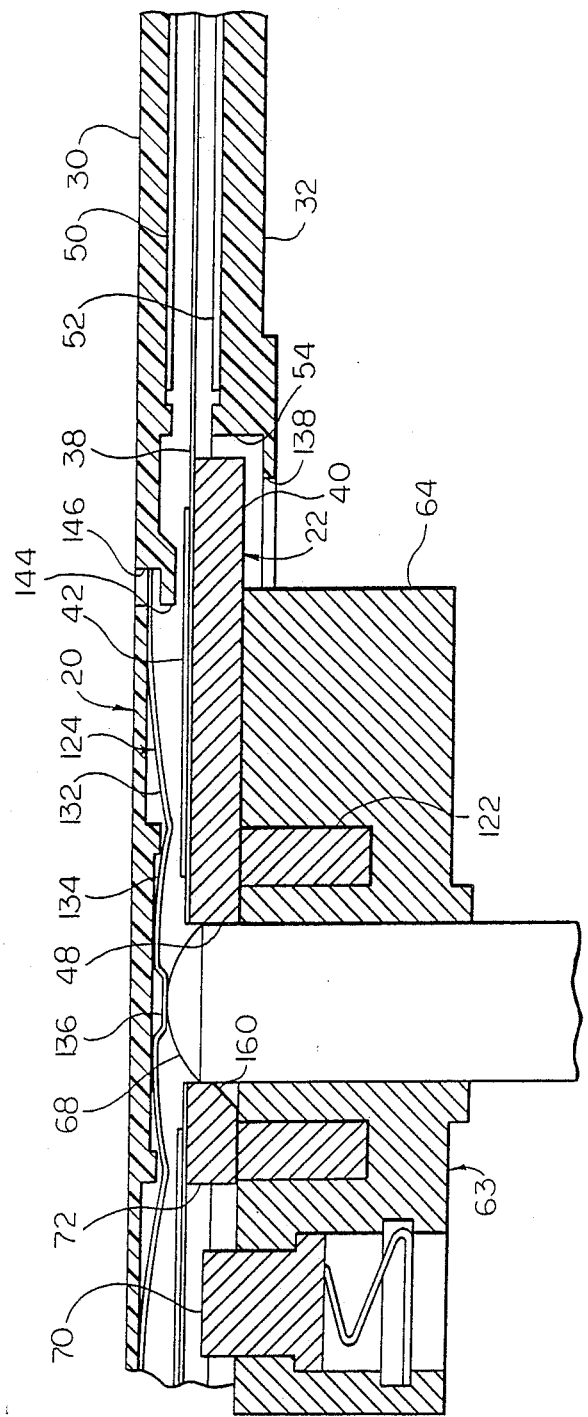

DISK CARTRIDGE WITH HUB SEAL

BACKGROUND OF THE INVENTION

This invention relates to recording disk cartridges and, more particularly, to a cartridge having a hub sealing arrangement for protection against contaminants when the cartridge is not in use.

Recording disk cartridges commonly are used in computer systems to provide a removably replaceable medium for the mass storage of data.

For computers employing 3.5 inch flexible magnetic disk drives, the disks are constructed of a thin sheet-like carrier, such as a polymeric film coated on its exterior surfaces with magnetic recording material such as a gamma ferric oxide, barium ferrite or the like. A rigid hub attached the center of the carrier of recording material permits connection of the disk to a drive which rotates the disk past one or more recording heads which serve to write magnetically data onto the disk and to read magnetically data from the disk. The disk is enclosed within a thin semi-rigid case having opposed walls with disk cleaning liners of soft nonwoven material disposed on opposite sides of the disk.

For other applications, such recording disk cartridges may employ a rigid magnetic disk or an optical data storage disk as the storage medium.

A disk cartridge, comprising a case with recording disk therein, is readily transported from one location to another. The previously mentioned 3.5 inch flexible magnetic cartridge is sufficiently small and thin so as to be carried in a person's shirt pocket. Recorded data is readily read from the disk, or is written or altered, by simply inserting the cartridge into a disk drive connected to a computer or other device which employs the data.

Disk drive components, such as the read/write heads and a hub engaging rotor for spinning the disk, obtain access to the disk through apertures provided in the walls of the case. For example, in a standard 3.5 inch flexible magnetic disk drive which is often employed for computer applications, the drive is provided with a rotor comprising a rotatable plate which abuts the disk hub and includes a central spindle which protrudes through a central aperture of the hub, and a pin which is offset from the spindle and engages within a pin receiving slot of the hub. The rotatable plate of the disk drive fits through an access opening in a bottom wall of the plastic case to engage with the hub, and lifts the hub away from peripheral portions of the access opening to free the disk for rotation between the liners of the case. If desired, a wear-resistant pad may be disposed on the inner surface of the top wall of the case to rest against the tip of the spindle, whereby the spindle serves to support the central portion of the top wall so as to overcome any warp in the semi-rigid plastic material of the upper wall and insure proper clearance for the disk between the case liners.

Access for the heads to interface with the disk is provided by a pair of radially extending slots formed, respectively, in the top and bottom walls in overlying registration with each other.

It is well known the dust, dirt, lint or other contaminants on the recording surfaces of the disk can lead to data read/write errors and, accordingly, the liners are provided to wipe the disk surfaces to remove contaminants as the disk rotates. To minimize entry of contaminants through the pair of head access slots when the cartridge is not located in a disk drive, the case is provided with a spring biased sliding shutter that automatically moves to a position covering the head access slots when the cartridge is removed from its operative position on the disk drive.

However, the disk contamination problem is not completely solved because the opening in the bottom wall allowing access of the rotatable drive plate to the hub, and the aperture in the center of the hub which receives the spindle can serve as entrances for contaminants, such as dust and lint, into the cartridge. Also, if the hub is constructed such that the offset slot for receiving the drive pin extends completely through the hub and is not otherwise closed, this slot provides yet another entrance for contaminants when the cartridge is not in use.

SUMMARY OF THE INVENTION

The foregoing problem is overcome and other advantages are provided by constructing a recording disk cartridge, in accordance with the invention, with a spring disposed between the disk and the top wall of the case for urging the hub towards the bottom wall of the case which normally faces the rotor when the cartridge is at its operative position in a disk drive. The spring has a generally dish shaped form and is symmetrically disposed about a central axis of the hub. It includes a central section which closes off a central spindle receiving aperture in the hub. By urging the hub towards the bottom wall, the spring forces the rim of the hub against a sealing lip encircling the hub access opening in the bottom wall, thereby closing off this opening upon ejection of the cartridge from a disk drive. The closure of the central spindle aperture of the hub, and the closing of the hub access opening in the bottom wall prevents the entry of contaminants from an external environment, such as a person's pocket, into the cartridge. Thereby, the spring serves as a mechanism for sealing the cartridge in the hub access area when the cartridge is ejected from a disk drive. When the cartridge is inserted in a disk drive, the spring is adapted to be displaced from its normal or first position, establishing the hub seal, by the spindle protruding through the hub central aperture, to a second position wherein the spring is disengaged from the disk to free the disk for rotation within the case by the rotor in the drive.

The spring is a composite monolithic structure comprising a concave shell including an array of radially extending fingers formed in an outer peripheral section of the spring. The central section of the spring is designed to have an oil-can type of spring action in response to an axially directed force applied to the spring by the spindle. The concave surface of the central section shell faces the top wall, and the end portions of the fingers contact the top wall. The compressive force exerted by the spring varies in accordance with displacement of its center section towards the top wall. During a sealed condition, wherein the hub presses against the bottom wall of the cartridge, the compressive force of the spring is greater by a factor of approximately five than the residual compressive force when the spring is displaced to its second position by the spindle. This residual force causes the spring to snap back automatically to the hub sealing first position when the spindle is withdraw in response to removing the cartridge from the drive. In the second position, the spring assumes a compact configuration wherein a portion of the central section engages the interior of the top wall and a depending dimple of the spring is positioned to serve as a wear pad for the top of the spindle which, through the spring, provides an upwardly directed force for supporting a central portion of the top wall to insure flatness of the wall which may tend to bow inwardly if not so supported.

The configuration of the spring with the array of fingers spaced by slots can be readily manufactured to a high degree of precision to insure a desired spring force at each position of the hub.

It is also noted that the generally flat configuration of the spring permits use of the spring in other enclosures wherein a mechanical action is required against a spring force which varies rapidly with displacement of a mechanical element.

BRIEF DESCRIPTION OF THE DRAWING

The foregoing aspects and other features of the invention are explained in the following description, taken in connection with the accompanying drawing wherein:

FIG. 2 is a sectional view, partially stylized, of a recording disk cartridge of the prior art, the figure indicating also components of a disk drive, in block diagram form, adapted to be employed in the operation of the cartridge;

FIG. 3 is a sectional view, partially stylized, of a recording disk cartridge embodying the invention, the figure showing also components of a disk drive, in block diagram form, adapted to be employed in the operation of the cartridge;

FIG. 4 is an enlarged sectional fragmentary view of a central portion of the cartridge of the invention along with a drive plate or rotor of a disk drive, the drive plate shown in a position of disengagement from the recording disk;

FIG. 5 is a plan view of the rotatable drive plate of FIG. 4;

FIG. 6 is an enlarged sectional fragmentary view of the cartridge of the invention showing engagement of the rotatable drive plate of FIG. 4 with the cartridge.

DETAILED DESCRIPTION

Figure 1:
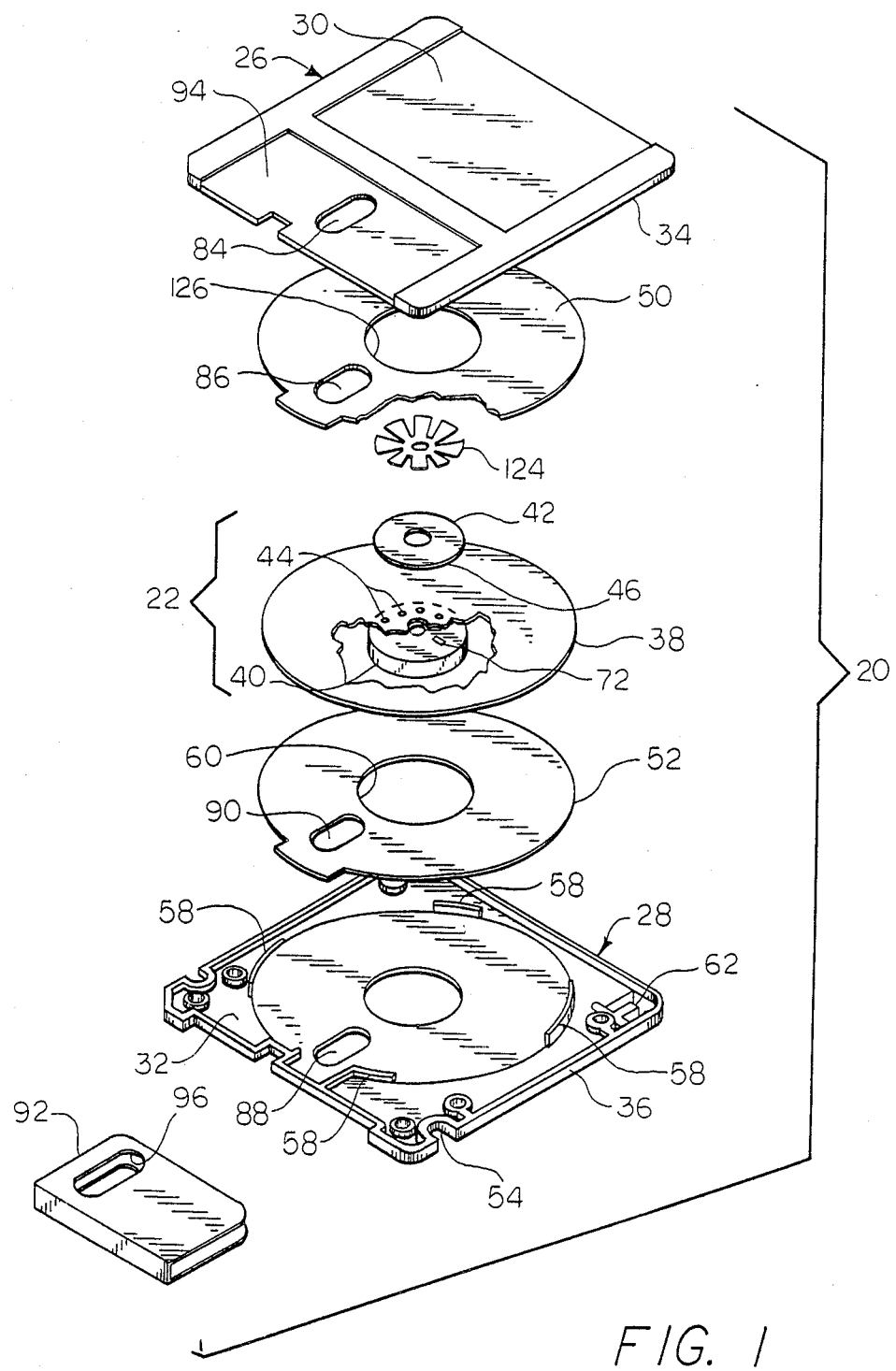
FIG. 1 is an exploded view of a cartridge incorporating the invention.

With reference to FIGS. 1 and 3, there is shown a cartridge 20 of the invention, the cartridge 20 including a recording disk 22 enclosed within a thin molded plastic case 24. The case 24 comprises a top shell 26 and a bottom shell 28. The shells 26 and 28 include, respectively, top and bottom walls 30 and 32 which are parallel to the disk 22, and sidewalls 34 and 36 which maintain a desired spacing between the top wall 30 and the bottom wall 32. The terms "top" and "bottom", as used herein, refer to the relative positions of components as portrayed in the figures, and are not to be construed as implying a specific orientation for the cartridge 20 since, as is well known, the cartridge may be used in a horizontally or vertically oriented disk drive.

The disk 22 comprises a circular flexible sheet-like carrier 38 of recording material on opposite sides thereof, a hub 40, in the form of a circular plate, for coupling the carrier 38 to a disk drive rotor, and an annular disk or ring 42 of plastic film, preferably mylar, for attaching hub 40 to carrier 38. A portion of the carrier 38 has been deleted in FIG. 1 to expose the hub 40. The hub 40 is adapted to be attached to bottom side of the carrier in centrally disposed concentric relation to the axis of carrier 38. The carrier 38 is provided with a series of apertures 44 communicating with the top surface of the hub 40, and the bottom surface of the annular disk or attachment ring 42 which is provided with an adhesive layer 46 on its underside. The annular disk 42 serves to secure the carrier 38 to the hub 40 by means of the adhesive layer 46, the adhesive of the layer 46 penetrating through the apertures 44 to the hub 40 to secure the carrier 38 between the annular disk 42 and the hub 40. Those portions of adhesive layer 46 surrounding the apertures 44 serve to attach the disk 42 to the top surface of carrier 38. The annular disk 42, the carrier 38 and the hub 40 are each provided with a central aperture which, upon the securing of the disk 42 to the carrier 38 and the hub 40 produce a central aperture 48 (FIG. 3) of the central hub section of recording disk 22 for receiving a spindle on the disk drive rotor. In the illustrated embodiment the hub section comprises the hub 40, attachment ring 42 and that portion of carrier 38 therebetween. For a more detailed description of this type of hub construction, reference may be had to commonly assigned, copending application, U.S. Ser. No. 101,995, filed Sept. 28, 1987, by Richard Gulbrandsen and entitled "Flexible Disk Cassette", said application being specifically incorporated by reference herein.

It should be understood that alternative hub structures may be used for disk 22. For example, the carrier 38 may be provided with a central aperture that is larger than aperture 48 and the periphery of hub 40 may be directly bonded or adhesively coupled to that portion of the carrier 38 surrounding its central aperture. This type of construction eliminates the need for the attachment ring 42 and the central aperture of hub 40 alone serves as the means of the disk hub section for receiving the spindle on the disk drive rotor.

In the preferred embodiment of the invention, the recording medium on opposite sides of the carrier 38 is a magnetic medium, it being understood that the principles of the invention apply also the situation wherein the carrier is configured for optical data storage or disk 22 is a rigid rather than a flexible disk.

A top liner 50 and a bottom liner 52 are located within the case 24 on opposite sides of the disk 22, the top liner 50 being secured to the interior surface of top wall 30, and the bottom liner 52 being secured to the interior surface of bottom wall 32. The liners 50 and 52 are formed of a nonwoven fabric such as rayon, and are secured to the respective walls 30 and 32 by conventional means, such as by heat sealing or ultrasonic sealing. The liners 50 and 52 serve wipe the recording surfaces to remove automatically any dust or contaminants which may be deposited on the disk 22, to prevent abrasion of the disk 22 and to prevent the build-up of static electricity at the disk 22.

The bottom wall 32 is provided with a central opening 54 which serves as an access opening or port for the disk spinning rotor of a disk drive, such as a disk drive 56 indicated schematically in FIG. 3, to engage to hub 40. Four arc-shaped ribs 58 may be arranged concentrically about the access opening 54 on the bottom wall 32 about the periphery of the liner 52 to stiffen the bottom wall 32, with a corresponding set of the rib (not shown)

being located on the top wall 30. The bottom liner 52 is also provided with a central aperture 60 to clear the rotor of disk drive 56 upon engagement of the drive with the disk 22. A moveable lug 62 may be provided in the bottom wall 32, as is common practice, to select whether disk recording or writing is to be allowed or prohibited during operation with the disk drive 56.

The disk drive 56 includes rotor 63 comprising a circular plate 64 which is fixed to and rotates with a central shaft 66 that includes an upstanding portion or spindle 68 which is received by the central aperture 48 of the disk 22, and an upstanding drive pin 70 which is radially offset from the spindle 68 and is received by a drive pin slot 72 (FIG. 1) in the hub 40 for imparting torque for rotation of the disk 22. It will be noted that in the illustrated embodiment, slot 72 is covered by an overlying portion of carrier 38, therefore its is not an entry point for contaminants. Alternatively, if the previously mentioned alternative hub construction is employed, the slot 72 may be formed so that it does not extend through to the upper surface of hub 40 to preclude entry of contaminants therethrough.

The shaft 66 is mechanically coupled to an electric motor 74 which imparts rotation to the shaft 66. The disk drive 56 also includes a movable interior frame which is adapted to receive and support the cartridge 20, to lower the cartridge inserted into the drive to an operative position wherein the rotor engages the hub, and upon manual actuation after drive operation to raise, and thereby disengage the cartridge, and partially eject the cartridge from the drive. Such a frame mechanism is well known to those familiar with standard 3.5 inch flexible disk drives and need not be described further here. In the drawings this type of frame mechanism is schematically show as a block designated support/ejector 76.

Also included within the disk drive 56 are top and bottom recording heads 78 and 80 which interact magnetically with the magnetic medium on the top and the bottom surfaces of the carrier 38 for the recording or playback of data. Electrical excitation of the heads 78 and 80 are provided by a well-known record/playback circuit 82.

Access for the top head 78 to the disk 22 is provided by slots 84 and 86, respectively, in the top wall 30 and the top liner 50, the two slots 84 and 86 being in registration with each other. Access for the bottom head 80 to the bottom surface of the disk 22 is provided by slots 88 and 90, respectively, in the bottom wall 32 and the bottom liner 52, the slots 88 and 90 being in registration with each other. A shutter 92 rides in a guide 94 of the top shell 26, and a similar guide (not shown) in the bottom shell 28 for closing off the slots 84 and 88 to prevent entry of disk contaminants therethrough when the cartridge 20 is not in use. The shutter 92 includes a pair of apertures 96 for exposing the apertures 84 and 88 upon a sliding of the shutter 92 within the guides 94 during operation of the disk drive 56.

With reference also to FIG. 2, there is provided a comparison of a cartridge 98, which is intended to be a schematic representation of a standard 3.5 inch flexible magnetic disk cartridge that is well known in the prior art, with the cartridge 20 of the invention. The cartridge 98 includes a disk 100 having a carrier 102 of magnetic recording material, the carrier 102 having attached thereto a central hat-shaped magnetically attractable metal hub 104. The disk 100 is enclosed by a thin molded plastic case 106. It is noted that the overall dimensions of the case 106 of the prior art are essentially the same as the overall dimensions of the case 24 employed in the construction of the invention. Also, the configuration of the useful portions of the carrier 102 of the prior art is essentially the same as that of the carrier 38 employed in the construction of the invention.

In FIG. 2, there is provided a disk drive 108 comprising the motor 74, the support/ejector mechanism 76, the recording heads 78 and 80, and the record/playback circuit 82 employed in the disk drive 56 of the invention. The disk drive 108 of FIG. 2 includes a rotor 109 comprising a plate 110 fixed on a shaft 112 driven by the motor 74, the plate 110 having a central upstanding spindle 114 and a pin 116 radially offset from the spindle 114. The spindle 114 and the pin 116 engage with the hub 104 upon a bringing together of the rotor 109 and the hub 104 by the mechanism 76. Typically, the plate 110 is made of magnetic material, or carries an annular magnet on its upper surface (not shown) for magnetically attracting and releasably holding the hub 104 in contact with plate 110.

By comparison of the disk drives 56 and 108 disclosed in FIGS. 2 and 3, it is appreciated that the cartridge 20 of the invention is operative with essentially the same disk drive components as are employed in the prior art.

It should be noted that in the cartridge of FIG. 2, the hub 104 has a peripheral rim section 117 and a depending crown section 118 that is accessible to the rotor 109 through the access opening 119. The outside diameter of rim 117 is larger than the diameter of opening 119 so the rim may bear against that portion of the case bottom wall when the cartridge in not in a drive. The outside diameter of the crown section 118 is smaller than the diameter of opening 119 so there is a loose fit of the crown with respect to the opening 119. This loose fitting construction permits the entry of contaminants into the case through the edges of opening 119 when the cartridge is not in a drive. Also, the central spindle receiving aperture 120 and the offset drive pin slot 121 are not closed or blocked so that contaminants also may enter the case through these two hub openings.

In accordance with the invention, the cartridge 20 avoid the problem of contamination entry through or around the hub by including a force generation means in the form of a dish shaped spring 124 (FIG. 1) located within the case 24 between the disk 22 and the top wall 30. The spring 124 extends from the top wall 30 to engage the central hub section of disk 22 through an aperture 126 in the top liner 50. The spring 124, in its normal or first position provides a compression force, and urges the disk 22 away from the top wall 30 toward the bottom wall 32. A central section of the spring 124 engages the upper side of the annular disk 42, on the top or opposite side of the disk from hub 40, to close the central aperture 48 and urge the hub 40 into closing relation to the access opening 54, and a peripheral section of the of the spring 124 contacts the interior surface of top wall 30.

Figure 7:
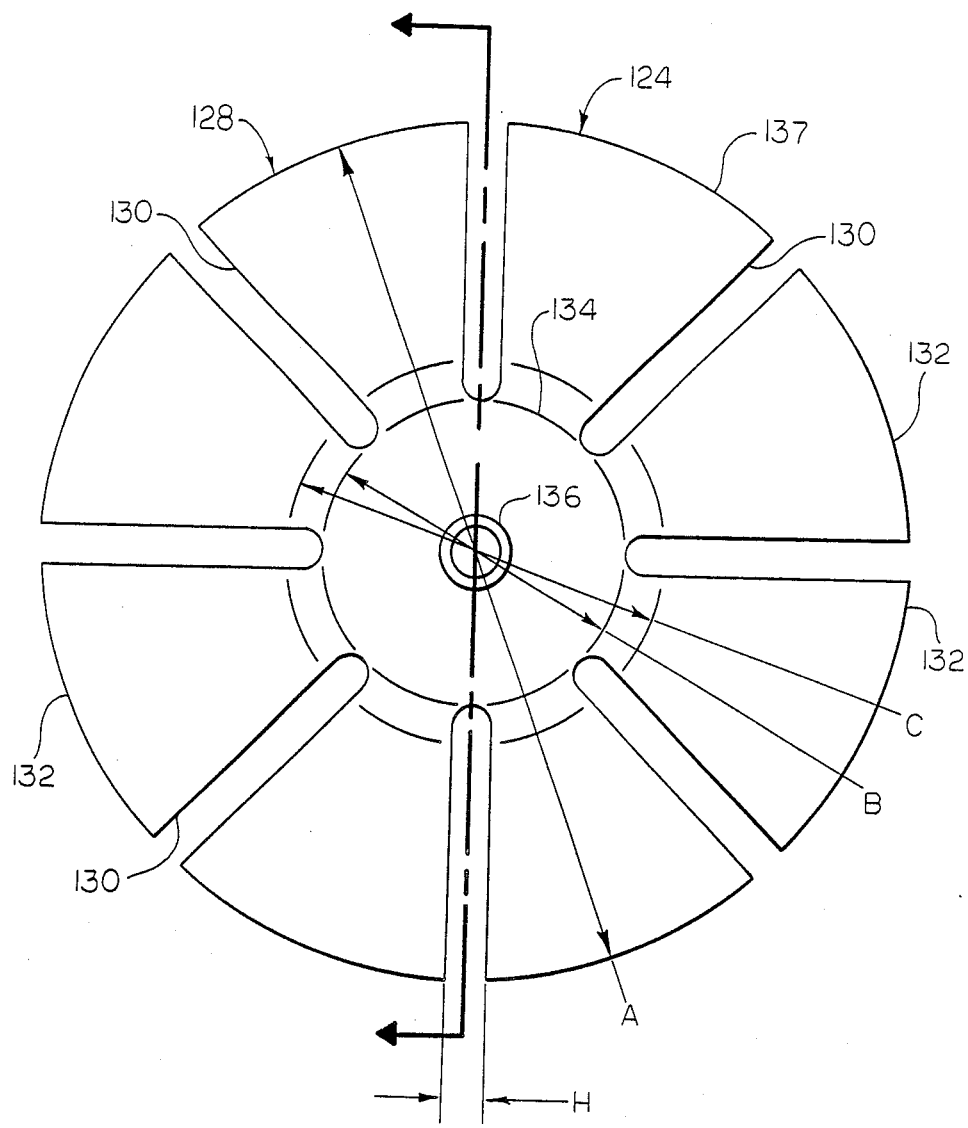
FIGS. 7 and 8 show, respectively, plan and sectional views of a spring employed in the construction of the cartridge of FIGS. 4 and 6.

With reference to FIGS. 4 and 6–8, there is provided a description of the configuration and operation of the spring 124. The spring 124 is generally dish shaped and is formed as a circular disk 128 flared symmetrically about a central axis of the spring 124, the disk 128 having radially extending slots 130. Eight slots 130 are symmetrically positioned about a center of the disk 128, as shown in FIG. 7, it being understood that more or fewer slots 130 might be provided. In the preferred embodiment of the invention, the sides of each slot 130 are substantially parallel to each other and are symmetrically positioned about a corresponding bisecting radius of the disk 128. The set of slots 130 define a set of fingers 132, each of the fingers 132 having symmetry about a corresponding bisecting radius of the disk 128. The outer end of a finger 132 has greater width than the inner end of the finger 132. The inner end of each of the slots 130 is terminated in a circular arc.

Figure 8:
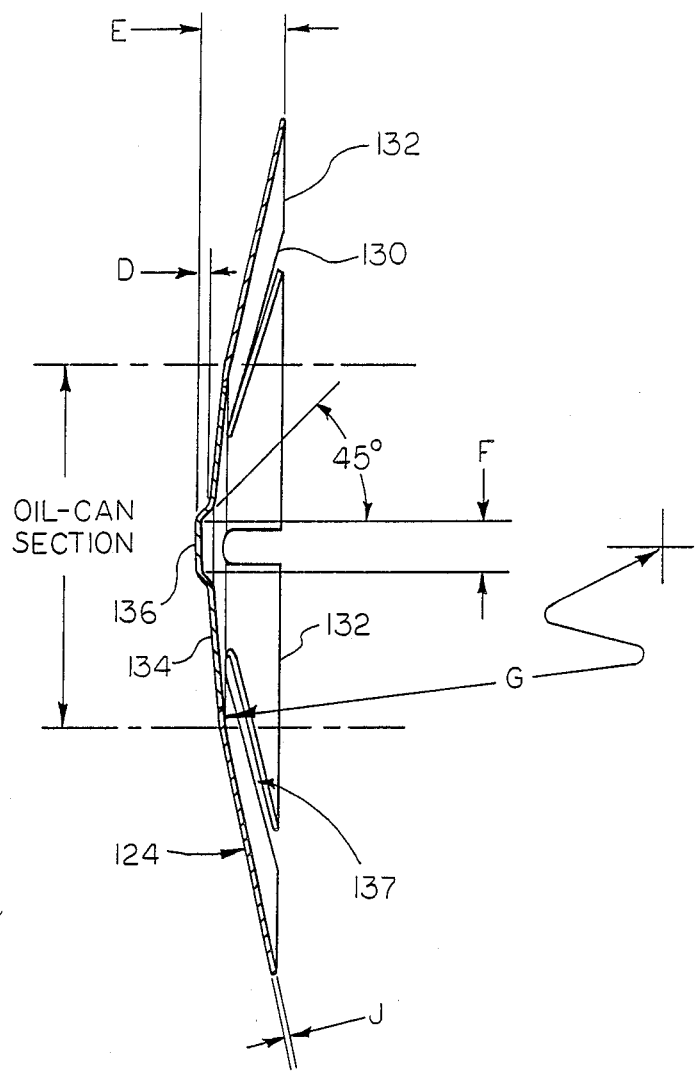

In the manufacture of the spring 124, the circular disk 128 is deformed, as by swaging, to produce a dish shaped central section or shell 134 symmetrically disposed about the central axis of disk 128 and having a depending dimple 136 in the center of section 134, shown best in the sectional view of FIG. 8. The fingers 132 extend as substantially straight rays, as seen in section, from the periphery of the central section 134 along a frusto-conical surface to define the outer or peripheral section 137 of spring 124. The concave central section 134 may be referred to as an oil-can section of the spring 124 as will be explained later herein.

The spring 124 is fabricated, in the preferred embodiment of beryllium copper, ¾ hard. The beryllium copper provides an excellent bearing surface against which a stainless steel spindle can press as shown in FIG. 6. The spindle 68 is fabricated of stainless steel so as to provide for a wear-resistant contact with the dimple 136 during rotation of the spindle 68.

For use in a 3.5 inch format cartridge, the following dimensions are employed in the manufacture of the spring 124. The diameter of the blank circular disk 128, prior to the formation of the spring 124, indicated by dimension A in FIG. 7, is 0.870 inch. Inner and outer diameters bounding the arcuate ends of the slots 130, indicated by legends B an C in FIG. 7, are 0.300 inch and 0.320 inch, respectively. B, 0.300 inch.

The height of the dimple 136, dimension D, in FIG. 8, is 0.010 inch. The total height of the spring 124, dimension E in FIG. 8, is 0.085 inch. Sidewalls of the dimple 136 are inclined at an angle of 45 degrees to a central axis of the spring 124, as shown in FIG. 8. The width of the dimple 136, dimension F in FIG. 8 is 0.050 inch. The concave upper surface of central section 134 is formed about a constant radius, dimension G in FIG. 8, of length 0.375 inch. The width of a slot 130, dimension H in FIG. 7, is 0.040 inch. The thickness of the blank circular disk 128, dimension J in FIG. 8, is 0.004 inch.

The operation of the spring 124 before and during engagement of the rotor 63 of a disk drive with the disk 22 of the cartridge 20 is shown in FIGS. 4 and 6, respectively.

FIG. 4 shows the position of the rotor 63 relative to the cartridge 20 prior to engagement of the spindle 68 and the pin 70 with the hub section of disk 22. FIG. 6 shows the cartridge 20 at its operative position in the drive with rotor 63 in engagement with hub 40. The pin 70 is received in the slot 72, and the spindle 68 is received in the central aperture 48 so that the protruding tip of the spindle 68 presses against the dimple 136 in the center of the spring 124 to axially displace the spring from its first position of FIG. 4 to its second position of FIG. 6. The plate 64, in FIG. 6, lifts the hub 40 away from a lip 138 of the aperture 54 in the bottom wall 32, the hub 40, in FIG. 6, being shown at its final position in which the carrier 38 is spaced equally relative to the upper liner 50 and the lower liner 52. In contrast, in FIG. 4, the compressive force provided on the hub section of the disk urges the center of the disk toward bottom wall 32 so that the periphery of the hub 40 is pressed in engagement with the lip 138 of the access opening 54 to close or block this opening and prevent the entry of contaminants therethrough and the bottom surface of central section 134 surrounding dimple 136 engages the hub section to close or block the central spindle receiving aperture 48 to prevent the entry of contaminants therethrough.

In FIG. 4, the configuration of the spring 124 is flattened somewhat from the unstressed curved configuration in FIG. 8 to develop, in its first position, a loading force on the hub section of approximately 115 grams. This force is due to compression of the spring 124 between the top wall 30 and the hub section of the disk, the compressive force compressing the bottom surface of the periphery of the hub 40 against the top surface of the lip 138.

In FIG. 6, the upward axial displacement of the dimple 136 by spindle 68 has introduced a deformation of the spring 124 thereby moving it to its second position. The deformation of the spring 124 transforms the concave surface of the central section 134 surrounding dimple 136 and facing the top wall 30 to a convex surface which faces the top wall 30. In this second position, that portion of the center section at the periphery of dimple 136 engages the interior surface of top wall 30 in bearing relation thereto. In the configuration shown in FIG. 6, the spring 124 still exerts a residual compressive force, the compressive force being between the top wall 30 and the top of the spindle 68. This residual compressive force has been reduced to a loading of approximately 22 grams exerted by the spring 124 against the spindle 68 and serves to cause the spring to return automatically to its first position when the spindle 68 is disengaged from the spring 124 when the cartridge is removed from the drive. In particular, it is noted that, in FIG. 6, the spindle 68 has lifted the spring 124 away from the hub section so that the spring 124 no longer exerts a force upon the disk thereby freeing the disk for rotation. The fingers 132 serve as an extension of central section 134 and flex in response to the oil-can action to increase the vertical displacement of the center of the spring to insure that the spring 124 is completely disengaged from the disk when it is moved to its second position by the spindle 68.

The depending dimple 136 is provided so that when the spring 124 is in its second position, the dimple 136 is in the correct vertical position within the case for the tip of the spindle in engagement therewith to provide an upwardly directed force through the spring 124 on the central region of the top wall 30 serving to urge the top wall 30 upwardly, and to support the central portion of the top wall 30 upon the spindle 68 in the manner of a tent pole supporting a tent. As is well known, the top wall 30, as well as other components of the case 24 (FIG. 3) is fabricated of a polymer plastic such as an ABS plastic which is semirigid and subject to warping or bending due to handling of the cartridge 20. The lifting of the central portion of the top wall 30 by the spindle 68 and the spring 124 adjusts the position of the top wall 30 relative to the bottom wall 32 and the disk 22 so as to assure proper clearance between the liners 50 and 52 relative to the carrier 38 of the recording medium. This supporting function corresponds to the supporting function in the prior art cartridge 98 of FIG. 2 wherein a wear-resistant pad 140 is secured to the midpoint of the top wall of the case 106 and rests against the top end of the spindle 114 during rotation of the disk 100 by the drive 108. Thus the spring 124 in its second position serves as a wear pad or bearing surface for the spindle 68 thereby preventing the rotating spindle 68 from making contact with and causing damage to the interior surface of the plastic wall 30.

When the cartridge 20 is ejected from the drive, the spindle 68 is withdrawn from aperture 48 and disengages from the dimple 136. As a result of the residual compressive force in spring 124, the oil-can central section 134 automatically snaps back from the second position to the first position of FIG. 4.

With reference to FIGS. 4 and 5, a further feature of the invention is described, this feature relating to the magnetic holding of the disk hub 40 upon the plate 64. The plate 64, which may be fabricated of stainless steel, is provided with the annular magnet 122, the magnet 122 being held within an annular trough 142 formed in a top surface of the plate 64.

The hub 40 is preferably fabricated of a magnetically attractive metal, such as steel or the like, or it may be formed of particles of magnetic material disposed in a plastic binder. Thereby, the magnetism of the magnet 122 induces a magnetic field in both the plate 64 and the hub 40 for attracting the hub 40 to the plate 64. The magnetic field secures the hub 40 to the plate 64 during rotation of the plate 64 and the hub 40, and insures precise positioning and orientation of the disk 22 during rotation of the disk 22.

An additional feature of the invention, useful in the placement of the spring 124 in the cartridge 20 during construction of the cartridge 20 is described with reference to FIGS. 1, 4, and 8. Prior to assembly of the cartridge 20, the various components are arranged as shown in FIG. 1. The spring 124 is secured to the top wall 30 by two tabs 144 which are located on the top wall 30 at points of convenience for receiving and holding the outer ends of the fingers at the periphery of the spring 124. The tabs 144 need not be located at the ends of a diameter of the spring 124, it being sufficient to locate the tabs 144 on generally opposite sides of the spring 124 so as to engage with two of the fingers 132 and hold the spring 124 to the top shell 26 during assembly of the cartridge 20. The tabs 144 may be produced readily during a molding of the top shell 26 by providing for mold component access apertures 146 in wall 30 at the sites of the tabs 144. After assembly, an adhesive paper or plastic label may be attached to the exterior of wall 30 for covering the apertures 146 to prevent the entry of contaminants therethrough.

The drive pin 70 may be mounted fixedly to the plate 64, or, as shown in FIGS. 4 and 6, preferably may be mounted slidably in the plate 64 with spring-loading to urge the pin 70 upward towards the disk 22. For the slidable mounting, the plate 64 is provided with a passage 148 offset and parallel to an axis of the spindle 68. The passage 148 is provided with a shelf 150 which engages with a collar 152 of the pin 70 to hold the pin 70 within the passage 148 against the force of a spring 154. The spring 154 is of spiral form, and includes an enlarged lower portion secured within a transverse channel 156 in a wall of the passage 148. A top end of the spring 154 contacts a bottom surface of the pin 70 to exert a compressive force between the pin 70 and the channel 156. In the manufacture of the rotor 63, the pin 70 is inserted from the bottom of the passage 148, and the spring 154 is inserted after the pin 70 and secured within the channel 156. During engagement of the rotor 63 with the cartridge 20, the pin 70 contacts a bottom surface of the hub 40 and then, under pressure of the spring 54, is urged into the slot 72 of the hub 40. The use of the spring loading of the pin 70 facilitates engagement of the pin 70 with the slot 72 as the plate 64 and the hub 40 approach each other during an engagement process. The slot 72 may be provided with a chamfer 158 along the lower portion of the slot 72 to facilitate insertion of the pin 70 into the slot 72. A chamfer 160 may also be provided for the central aperture 48 of the hub 40 to facilitate entry of the spindle 68.

An important feature of the invention is shown in FIG. 4, this feature being the closure of the central aperture 48 of the hub 40 by the central portion 134 of the spring 124, and also the closure of the access opening 54 in the bottom wall 32 by pressure of the hub 40 against the lip 138.

In conventional cartridges, such as the cartridge 98 of FIG. 2, the central aperture 120 and pin slot 121 of the hub, and the access opening in the bottom wall of the case 106 are open during periods of nonuse of the cartridge 98, these open apertures providing access for the entry of contaminants such as dust and lint.

In contrast, in the cartridge 20 of the invention as depicted in FIG. 4, the spring 124 provides the dual functions of closing off both aperture 48 and opening 54. The slot 72 (FIG. 1) in the hub 40 is closed off on the top side of the hub 40 by the overlying portion of carrier 38 and annular disk 42 to prevent entry of contaminants therethrough.

In addition, the higher compressive force provided by the spring 124, during the first position distended configuration of the central portion 134, with the concave surface pointing up, provides increased security against entry of contaminants. The spring 124 generates a relatively small force, when the spring 124 is displaced to its compact second position, providing its automatic return to the first position when the cartridge is removed from the drive.

The unique properties of the spring 124 are due in part to the composite structure of the spring 124 wherein the central portion 134 is formed as an oil-can section which can be transformed from the concave to convex shape in response to axial displacement of the central section between the normal first position of the spring shown in FIG. 4, and its second position shown in FIG. 6 while the concave surface of the flare of the fingers 132 remain oriented upward towards the top wall 30 independently of a displacement of the dimple 136 along the axis of the spindle 68. Both the peripheral finger section 137 and the central section 134 of the spring 124 are formed out of a single blank circular disk to attain a monolithic construction of the spring 124. Thereby, the spring 124 can be manufactured in large quantities while retaining precise control of the relatively large rest force, when the cartridge is in non-use, and the relatively small running force when the disk is rotating.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A disk cartridge for use with a disk drive having a rotor, including a spindle, for rotating a disk, said cartridge comprising:
    a disk having a recording medium thereon and including a hub having a spindle receiving central aperture through which the spindle extends and protrudes when said hub is in engagement with the rotor;

a case enclosing said disk, said case including first and second walls disposed on opposite sides of said disk, said first wall having an access opening therein providing access for the rotor to engage said hub when said cartridge is operatively positioned in the disk drive;

means, within said case disposed in a first position engaging disk when said cartridge is not operatively positioned in the disk drive, for urging said disk toward said first wall so that said hub closes said access opening and said urging means closes said central aperture to prevent entry of disk contaminants therethrough, said urging means being displaceable from said first position by said spindle protruding from said central aperture, when said cartridge is operatively positioned in the disk drive, to a second position wherein said urging means is disengaged from said disk to free said disk for rotation.

2. The disk cartridge of claim 1 wherein said urging means includes a spring disposed between said second wall and said disk in alignment with said central aperture.

3. The disk cartridge of claim 2 where said spring is a circular spring which is dish shaped when unstressed.

4. The disk cartridge of claim 1 wherein said urging means includes a spring, which is dish shaped when unstressed, disposed between said second wall and said disk, said spring including a central section which is aligned with and blocks said hub central aperture when said spring is in said first position, said central section being adapted to be engaged by the protruding spindle for displacing spring to said second position.

5. The disk cartridge of claim 4 wherein said spring is circular and further includes an outer peripheral section, adapted to engage an inner surface of said second wall, said peripheral section being joined to and surrounding said central section, said sections cooperating to define a generally concave surface facing said second wall when said spring is in said first position, said concave surface being resiliently deformed when said spring is displaced to said second position such that said central section assumes a generally convex surface configuration facing said second wall.

6. The disk cartridge of claim 5 wherein said outer peripheral section has a plurality of radially extending slots symmetrically disposed about a central axis of said spring, said slots defining fingers between next adjacent slots, said fingers being adapted to have outer ends thereof in engagement with said second wall.

7. The disk cartridge of claim 1 wherein said urging means includes a spring that is dish shaped when unstressed, between said second wall and said disk, which applies a compressive force of a given magnitude to said disk when said spring is in said first position, and applies a compressive force of less than said given magnitude to the protruding spindle when the spindle displaces said spring to said second position.

8. The disk cartridge of claim 7 wherein said walls are semi-rigid, and when said spring is in said second position, said spindle applies a force through said spring to said second wall to support said second wall in a substantially flat configuration thereby preventing said second wall from bowing toward said first wall.

9. The disk cartridge of claim 8 wherein said spring in said second position serves as a wear pad in engagement with the tip of the spindle to protect the inner surface of said second against contact by said spindle tip.

10. The disk cartridge of claim 1 wherein said urging means is configured to be engaged by the spindle for displacement from said first to said second position, and said urging means is configured to return automatically from said second to said first position upon disengagement from the spindle.

11. A disk cartridge for use with a disk drive having a rotor, including a spindle, for rotating a disk, said cartridge comprising:

a disk having a recording medium thereon and including a circular hub having a spindle receiving central aperture through which the spindle extends and protrudes when said hub is in engagement with the rotor;

a case enclosing said disk, said case including first and second walls disposed on opposite sides of said disk, said first wall having a circular access opening therein providing access for the rotor to engage said hub when said cartridge is operatively positioned in the disk drive, said access opening having a diameter smaller than the diameter of said hub;

a circular spring, being dish shaped when unstressed, disposed between said second wall and said disk in alignment with said central aperture, said spring being in a first position engaging said disk, when said cartridge is not operatively positioned in the disk drive, for urging said disk toward said first wall so that a peripheral portion of said hub engages a facing portion of said first wall surrounding said access opening to close said access opening and a central section of said spring engages a facing portion of said disk surrounding said central aperture to close said central aperture to prevent entry of disk contaminants therethrough, said spring being displaceable from said first position by said spindle, protruding from said central aperture when said cartridge is operatively positioned in the disk drive, to a second position wherein said spring is disengaged from id disk to free said disk for rotation.

12. The disk cartridge of claim 11 wherein said spring includes an outer peripheral section adapted to engage an inner surface of said second wall, said peripheral section being joined to and surrounding said central section.

13. The disk cartridge of claim 12 wherein said sections of said spring cooperate to define a generally concave surface facing said second wall when said spring is in said first position, and said spring is resiliently deformable such that said central section has a generally convex surface configuration facing said second wall when said spring is in said second position.

14. The disk cartridge of claim 13 wherein said peripheral section has a plurality radially extending slots symmetrically disposed about a central axis of said spring, said slots defining a finger between each pair of next adjacent slots.

15. The disk cartridge of claim 11 wherein said spring is displaceable from said first to said second position in response to a compressive force applied thereto by the spindle in a direction along the axis of said central aperture.

16. The disk cartridge of claim 11 wherein said spring located in said second position directs a force applied thereto by the spindle to said second wall for preventing said second wall from bowing toward said first wall.

17. The disk cartridge of claim 16 wherein said spring serves as a wear pad to prevent damage to said second wall by the protruding tip of the spindle.

* * * * *